United States Patent
Caine et al.

(10) Patent No.: US 7,347,178 B2
(45) Date of Patent: Mar. 25, 2008

(54) SYSTEM AND METHOD FOR CONTROLLING AUTO-IGNITION

(75) Inventors: Jon Caine, South Woodham Ferrers (GB); Themi Philemon Petridis, London (GB); Martin Wirth, Remscheid (DE); Wilfried Kaulen, Weilerswist (DE)

(73) Assignee: Ford Global Technologies, LLC, Dearborn, MI (US)

( * ) Notice: Subject to any disclaimer, the term of this patent is extended or adjusted under 35 U.S.C. 154(b) by 10 days.

(21) Appl. No.: 11/331,657

(22) Filed: Jan. 12, 2006

(65) Prior Publication Data

US 2007/0157901 A1    Jul. 12, 2007

(51) Int. Cl.
*F01L 1/44*    (2006.01)
(52) U.S. Cl. ............... 123/295; 123/302; 123/90.15
(58) Field of Classification Search ........... 123/295, 123/302, 90.15, 90.16, 90.17, 90.18
See application file for complete search history.

(56) References Cited

U.S. PATENT DOCUMENTS

| | | | | |
|---|---|---|---|---|
| 5,138,989 A | * | 8/1992 | Fraidl et al. ............... | 123/302 |
| 5,269,270 A | * | 12/1993 | Suzuki et al. ............ | 123/90.16 |
| 5,273,006 A | * | 12/1993 | Schapertons et al. .... | 123/90.16 |
| 5,301,636 A | * | 4/1994 | Nakamura ............... | 123/90.16 |
| 5,647,312 A | * | 7/1997 | Salber et al. ............ | 123/90.16 |
| 6,336,436 B1 | * | 1/2002 | Miyakubo et al. .......... | 123/295 |
| 6,640,771 B2 | | 11/2003 | Fuerhapter | |
| 6,655,329 B2 | | 12/2003 | Kammerdiener et al. | |
| 6,681,751 B1 | | 1/2004 | Ma | |
| 6,782,853 B2 | | 8/2004 | Kanamaru et al. | |
| 7,080,613 B2 | * | 7/2006 | Kuo et al. ............... | 123/90.15 |
| 2002/0112692 A1 | * | 8/2002 | Abo et al. ................... | 123/295 |
| 2003/0217733 A1 | * | 11/2003 | Shiraishi et al. ............ | 123/295 |
| 2004/0079322 A1 | * | 4/2004 | Shiraishi et al. ............ | 123/295 |

* cited by examiner

*Primary Examiner*—Erick Solis
(74) *Attorney, Agent, or Firm*—Allan J. Lippa; Alleman Hall McCoy Russell & Tuttle LLP

(57) ABSTRACT

A method for operating an engine of a vehicle, the engine having a cylinder with at least a first and second valve, the method comprising during a first mode, operating with the first valve active and the second valve deactivated during a cycle of the cylinder, where during said first mode, the cylinder operates to allow at least air to enter the cylinder during an intake stroke, where the air is mixed with fuel and compressed to attain auto-ignition; and during a second mode, operating with the first and second valves active during a cycle of the cylinder, where during said second mode, cylinder operates to allow at least air to enter the cylinder, where the air is mixed with fuel and ignited via a spark from an ignition plug.

19 Claims, 8 Drawing Sheets

SYSTEM AND METHOD FOR CONTROLLING AUTO-IGNITION

BACKGROUND AND SUMMARY

Engines may use various combustion modes across different operating conditions to improve overall engine performance. For example, spark ignition (SI) combustion may be used under some conditions, while controlled auto-ignition (CAI), or homogenous charge compression ignition (HCCI), may be used under other conditions. In some cases, operating in these different modes uses different valve timing and/or lift. The different valve operation may enable the engine to reliably achieve the desired type of ignition or combustion while meeting emissions and performance targets.

One approach to provide different valve operation in different combustion modes is described in U.S. Pat. No. 6,640,771. In this example, multiple intake valves are operated with different lift profiles in different combustion modes. Further, in one example, at least two intake valves are provided in each cylinder, where one intake valve is changeable between a first and second lift and the other intake valve may be actuated into an OFF position by means of a valve cut-off device. Thus, each intake valve switch changes an effective valve lift in different modes.

The inventors herein have recognized disadvantages with such an approach. In particular, because each valve has switchable valve operation in order to provide the different lift profiles, and there are multiple valves per cylinder, each cylinder may need multiple actuators. In multi-cylinder engines, such increased numbers of actuators can result in increased system cost and weight. Further, the increased number of actuators may require increased hydraulic pressure or capacity in the case of hydraulic actuators, thus potentially further increasing weight and increasing cost.

In one approach, the above issues may be addressed by a method for operating an engine of a vehicle, the engine having a cylinder with at least a first and second valve, the method comprising: during a first mode, operating with the first valve active and the second valve deactivated during a cycle of the cylinder, where during said first mode, the cylinder operates to allow at least air to enter the cylinder during an intake stroke, where the air is mixed with fuel and compressed to attain auto-ignition; and during a second mode, operating with the first and second valves active during a cycle of the cylinder, where during said second mode, cylinder operates to allow at least air to enter the cylinder, where the air is mixed with fuel and ignited via a spark from an ignition plug.

In this way, it is possible to provide a transition between different lift profiles when changing combustion from auto-ignition or compression ignition to spark ignition by simply activating the second valve (although changes in other valve operation may also be used, if desired).

DETAILED DESCRIPTION

Figure 1:
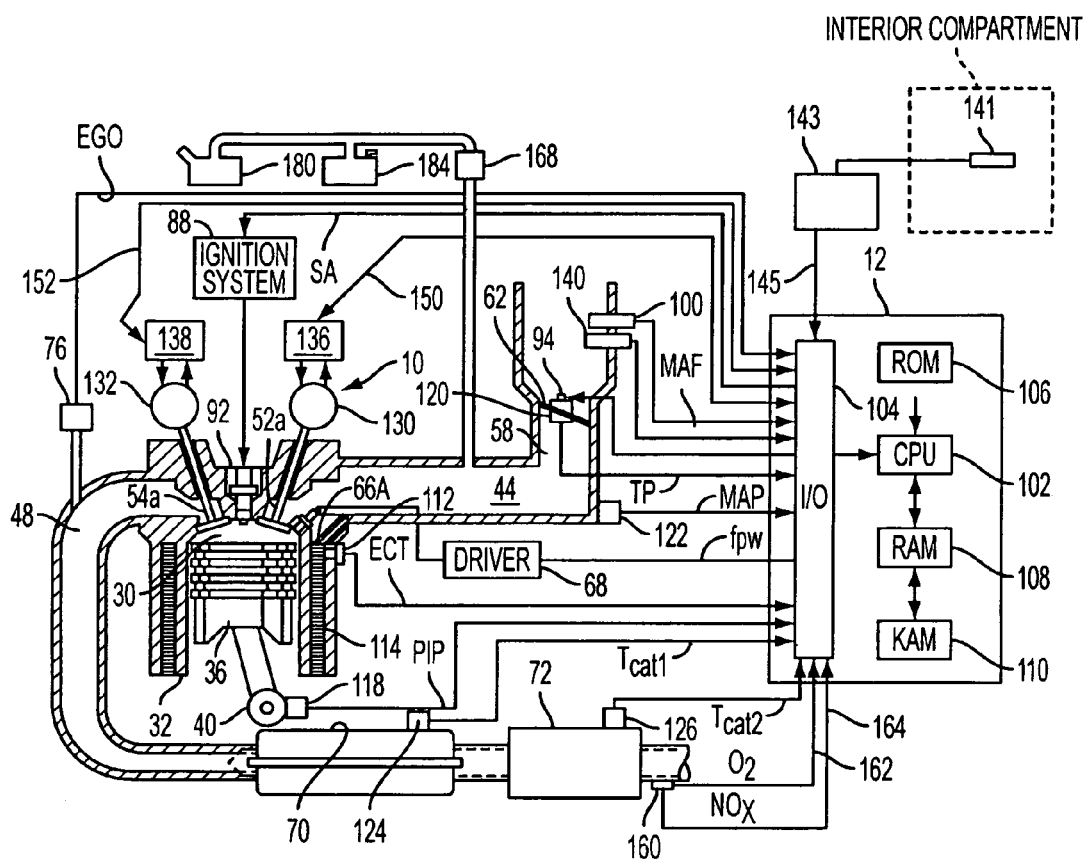
FIG. 1 shows an example engine cylinder configuration.

FIG. 1 shows one cylinder of a multi-cylinder engine, as well as the intake and exhaust path connected to that cylinder. Continuing with FIG. 1, direct injection internal combustion engine 10, comprising a plurality of combustion chambers, is controlled by electronic engine controller 12. Combustion chamber 30 of engine 10 is shown including combustion chamber walls 32 with piston 36 positioned therein and connected to crankshaft 40. A starter motor (not shown) is coupled to crankshaft 40 via a flywheel (not shown). Combustion chamber, or cylinder, 30 is shown communicating with intake manifold 44 and exhaust manifold 48 via respective intake valves 52a and 52b (not shown, see FIG. 2), and exhaust valves 54a and 54b (not shown, see FIG. 2). Fuel injector 66A is shown directly coupled to combustion chamber 30 for delivering injected fuel directly therein in proportion to the pulse width of signal fpw received from controller 12 via electronic driver 68. The fuel injector may be mounted in the side of the combustion chamber or in the top of the combustion chamber, for example. Fuel is delivered to fuel injector 66A by a conventional high pressure fuel system (not shown) including a fuel tank, fuel pumps, and a fuel rail.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94. This configuration is commonly referred to as electronic throttle control (ETC), which is also utilized during idle speed control. In an alternative embodiment (not shown), which is well known to those skilled in the art, a bypass air passageway is arranged in parallel with throttle plate 62 to control inducted airflow during idle speed control via a throttle control valve positioned within the air passageway.

Exhaust gas sensor 76 is shown coupled to exhaust manifold 48 upstream of catalytic converter 70. Note that sensor 76 corresponds to various different sensors, depending on the exhaust configuration as described below with regard to FIG. 1B. Sensor 76 may be any of many known sensors for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

Ignition system 88 provides an ignition spark to combustion chamber 30 via spark plug 92 in response to spark advance signal SA from controller 12, under select operating modes. Though spark ignition components are shown, engine 10 (or a portion of the cylinders thereof) may be operated in a compression ignition mode, with or without spark assist, as explained in more detail below. Further, in an alternative embodiment, the combustion chamber has no spark plug.

Controller 12 may be configured to cause combustion chamber 30 to operate in various combustion modes, as described herein. The fuel injection timing may be varied to provide different combustion modes, along with other parameters, such as EGR, valve timing, valve operation, valve deactivation, etc.

Nitrogen oxide (NOx) adsorbent or trap 72 is shown positioned downstream of catalytic converter 70. NOx trap 72 is a three-way catalyst that adsorbs NOx when engine 10 is operating lean of stoichiometry. The adsorbed NOx is subsequently reacted with HC and CO and catalyzed when controller 12 causes engine 10 to operate in either a rich homogeneous mode or a near stoichiometric homogeneous mode such operation occurs during a NOx purge cycle when it is desired to purge stored NOx from NOx trap 72, or during a vapor purge cycle to recover fuel vapors from fuel tank 180 and fuel vapor storage canister 184 via purge control valve 168, or during operating modes requiring more engine power, or during operation modes regulating temperature of the emission control devices such as catalyst 70 or NOx trap 72. It will be understood that various different types and configurations of emission control devices and purging systems may be employed.

Controller 12 is shown in FIG. 1 as a conventional microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect (or other type) sensor 118 coupled to crankshaft 40; and throttle position, TP, from throttle position sensor 120; and absolute manifold pressure signal, MAP, from sensor 122. Engine speed signal, RPM, is generated by controller 12 from signal PIP in a conventional manner and manifold pressure signal MAP from a manifold pressure sensor provides an indication of vacuum, or pressure, in the intake manifold. Note that various combinations of the above sensors may be used, such as a MAF sensor without a MAP sensor, or vice versa. During stoichiometric operation, this sensor can give an indication of engine torque. Further, this sensor, along with engine speed, can provide an estimate of charge (including air) inducted into the cylinder. In one example, sensor 118, which is also used as an engine speed sensor, produces a predetermined number of equally spaced pulses every revolution of the crankshaft.

In this particular example, temperature Tcat1 of catalytic converter 70 and temperature Tcat2 of emission control device 72 (which can be a NOx trap) are inferred from engine operation as disclosed in U.S. Pat. No. 5,414,994, the specification of which is incorporated herein by reference. In an alternate embodiment, temperature Tcat1 is provided by temperature sensor 124 and temperature Tcat2 is provided by temperature sensor 126.

Continuing with FIG. 1, engine 10 is shown with an intake camshaft 130 and an exhaust camshaft 132, where camshaft 130 actuates both intake valves 52$a,b$ and camshaft 132 actuates both exhaust valves 54$a,b$. The valves can be actuated via lift profiles (see FIG. 2) on the camshafts, where the lift profiles between the different valves may vary in height, duration, and/or timing. However, alternative camshaft (overhead and/or pushrod) arrangements could be used, if desired.

Figure 2A:
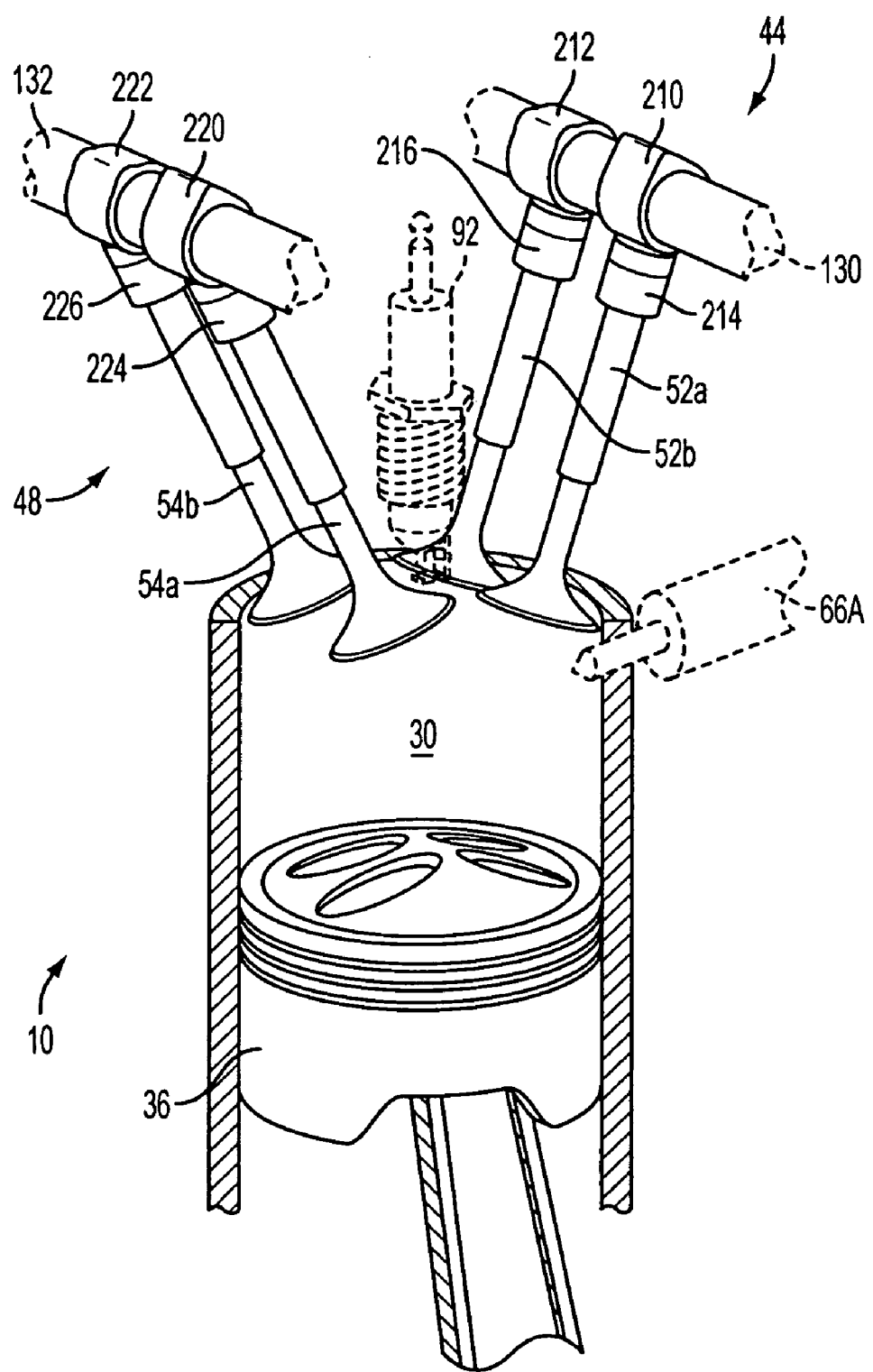
FIGS. 2A-B show a detailed view of example combustion chambers.
Figure 2B:
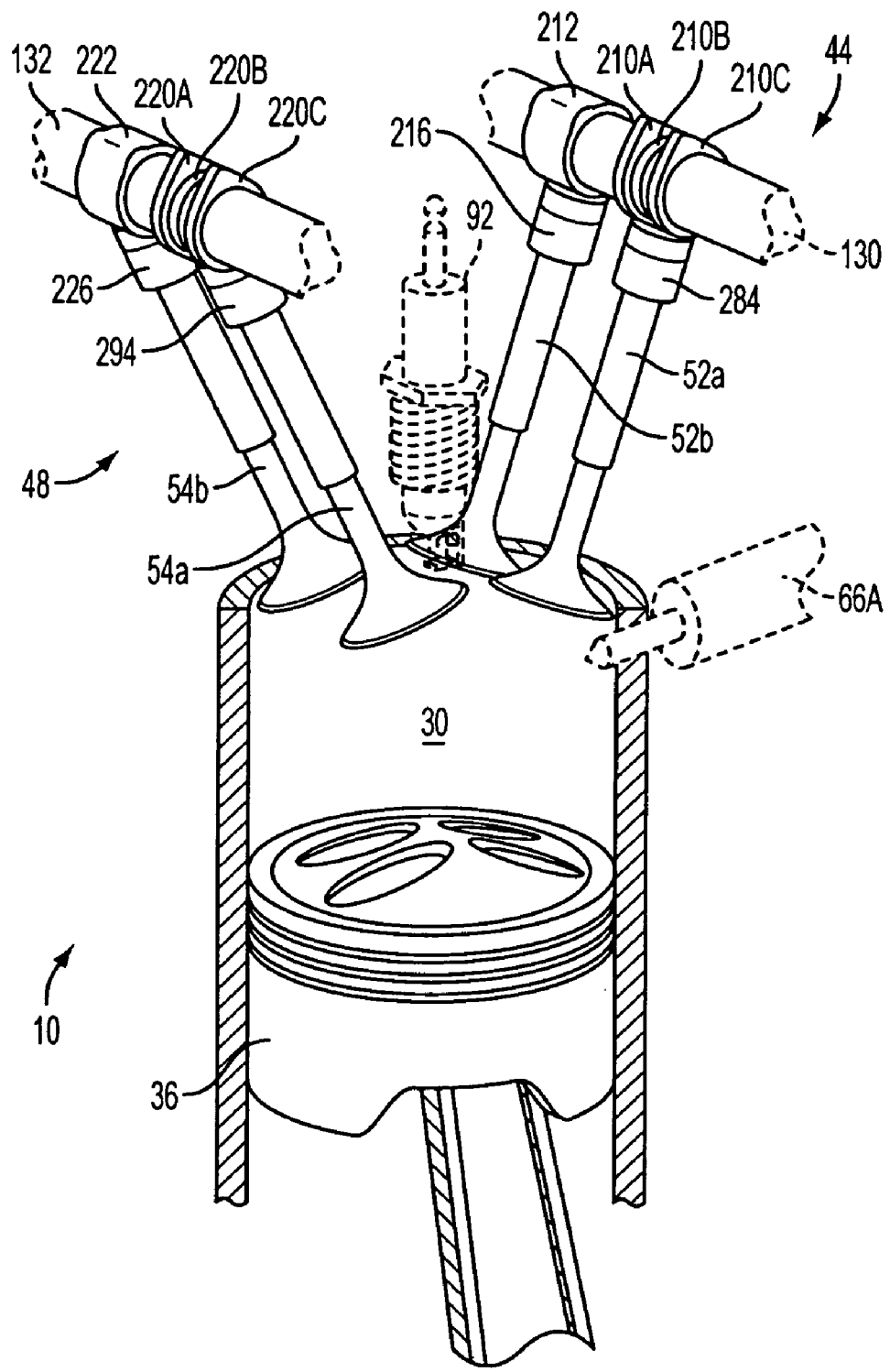

In one embodiment, which will described in more detail with regard to FIG. 2A, a deactivatable tappet may be used in the valve stem of one or more of the intake and exhaust valves 52 and 54 to provide individual valve deactivation under selected operating conditions. In this example, the tappet may have a lost motion action, for example. However, FIG. 2B shows an alternative example in which an alternative deactivatable tappet is shown in which only a portion of the tappet is deactivated. Further, in one example, the cam timing may be varied via actuators 136 and 138, based on operating conditions. The actuators may be hydraulically powered, or electrically actuated, or combinations thereof. Signal line 150 can send a valve timing control signal to unit 136 and receive a cam timing measurement. Likewise, signal line 152 can send a valve timing control signal to unit 138 and receive a cam timing measurement.

The processed sensor output of sensor 160 may provide an indication of both oxygen concentration in the exhaust gas as well as NOx concentration. For example, signal 162 provides controller a voltage indicative of the $O_2$ concentration while signal 164 provides a voltage indicative of NOx concentration. Alternatively, sensor 160 can be a HEGO, UEGO, EGO, or other type of exhaust gas sensor. Also note that, as described above with regard to sensor 76, sensor 160 can correspond to various different sensors depending on the system configuration.

As described above, FIG. 1 merely shows one cylinder of a multi-cylinder engine, and that each cylinder has its own set of intake/exhaust valves, fuel injectors, spark plugs, etc. In an alternative embodiment, a port fuel injection configuration may be used where a fuel injector is coupled to intake manifold 44 in a port, rather than directly to cylinder 30.

Further, in the disclosed embodiments, an exhaust gas recirculation (EGR) system routes a desired portion of exhaust gas from exhaust manifold 48 to intake manifold 44 via an EGR valve (not shown). Alternatively, a portion of combustion gases may be retained in the combustion chambers by controlling exhaust valve timing.

The engine 10 operates in various modes, including lean operation, rich operation, and "near stoichiometric" operation. "Near stoichiometric" operation refers to oscillatory operation around the stoichiometric air fuel ratio. Typically, this oscillatory operation is governed by feedback from exhaust gas oxygen sensors. In this near stoichiometric operating mode, the engine is operated within approximately one air-fuel ratio of the stoichiometric air-fuel ratio. This oscillatory operation is typically on the order of 1 Hz, but can vary faster and slower than 1 Hz. Further, the amplitude of the oscillations are typically less than 0.35 A/F from stoichiometric; but can be greater under various operating conditions. Note that this oscillation does not have to be symmetrical in amplitude or time. Further note that an air-fuel bias can be included, where the bias is adjusted slightly lean, or rich, of stoichiometry (e.g., within 1 air-fuel ratio of stoichiometry). Also note that this bias and the lean and rich oscillations can be governed by an estimate of the amount of oxygen stored in upstream and/or downstream three way catalysts.

As described below, feedback air-fuel ratio control is used for providing the near stoichiometric operation. Further, feedback from exhaust gas oxygen sensors can be used for controlling air-fuel ratio during lean and during rich operation. In particular, a switching type, heated exhaust gas oxygen sensor (HEGO) can be used for stoichiometric air-fuel ratio control by controlling fuel injected (or additional air via throttle or VCT) based on feedback from the HEGO sensor and the desired air-fuel ratio. Further, a UEGO sensor (which provides a substantially linear output versus exhaust air-fuel ratio) can be used for controlling air-fuel ratio during lean, rich, and stoichiometric operation. In this case, fuel injection (or additional air via throttle or variable valve timing or controlling which and a number of intake and/or exhaust valves that are active) is adjusted based on a desired air-fuel ratio and the air-fuel ratio from the sensor. Further still, individual cylinder air-fuel ratio control could be used, if desired.

Humidity sensing may also be employed in connection with the depicted embodiments. For example, an absolute, or relative, humidity sensor 140 is shown for measuring humidity of the ambient air. This sensor can be located either in the inlet air stream entering manifold 44, or measuring ambient air flowing through the engine compartment of the vehicle. Further, in an alternative embodiment, a second humidity sensor (141) is shown which is located in the interior of the vehicle and coupled to a second controller 143 that communicates with controller 12 via line 145. The control processes described below herein can be located in controller 12, or controller 143, or a combination thereof. Further note that the interior humidity sensor can be used in a climate control system that controls the climate in the passenger compartment of the vehicle. Specifically, it can be used to control the air-conditioning system, and more specifically, whether to enable or disable the air-conditioning compressor clutch which couples the compressor to the engine to operate the compressor.

Also note that humidity may be estimated or inferred based on various operating parameters, such as barometric pressure. Alternatively, humidity can be inferred based on auto-ignition characteristics in via adaptive learning. Further, barometric pressure and adaptive learning can be used in combination, and may also be used with sensed humidity values.

As will be described in more detail below, combustion in engine 10 can be of various types/modes, depending on operating conditions. In one example, spark ignition (SI) can be employed where the engine utilizes a sparking device, such as spark plug coupled in the combustion chamber, to regulate the timing of combustion chamber gas at a predetermined time after top dead center of the expansion stroke. In one example, during spark ignition operation, the temperature of the air entering the combustion chamber is considerably lower than the temperature required for auto-ignition. While SI combustion may be utilized across a broad range of engine torque and speed it may produce increased levels of NOx and lower fuel efficiency when compared with other types of combustion.

Another type of combustion that may be employed by engine 10 uses homogeneous charge compression ignition (HCCI), or controlled auto-ignition (CAI), where auto-ignition of combustion chamber gases occurs at a predetermined point after the compression stroke of the combustion cycle, or near top dead center of compression. Typically, when compression ignition of a pre-mixed air and fuel charge is utilized, fuel is normally homogeneously premixed with air, as in a port injected spark-ignited engine or direct injected fuel during an intake stroke, but with a high proportion of air to fuel. Since the air/fuel mixture is highly diluted by air or residual exhaust gases, which results in lower peak combustion gas temperatures, the production of NOx may be reduced compared to levels found in SI combustion. Furthermore, fuel efficiency while operating in a compression combustion mode may be increased by reducing the engine pumping loss, increasing the gas specific heat ratio, and by utilizing a higher compression ratio.

In compression ignition operation mode, it may be desirable to exercise close control over the timing of auto-ignition. The initial intake charge temperature directly affects the timing of auto-ignition. The start of ignition is not directly controlled by an event such as the injection of fuel in the standard diesel engine or the sparking of the spark plug in the spark ignited engine. Furthermore, the heat release rate is not controlled by either the rate or duration of the fuel-injection process, as in the diesel engine, or by the turbulent flame propagation time, as in the spark-ignited engine.

Note that auto-ignition is also a phenomenon that may cause knock in a spark-ignited engine. Knock may be undesirable in spark-ignited engines because it enhances heat transfer within the cylinder and may burn or damage the piston. In controlled compression ignition operation, with its high air-to-fuel ratio, knock does not generally cause degradation of the engine because the diluted charge keeps the rate of pressure rise low and the maximum temperature of the burned gases relatively low. The lower rate of pressure rise mitigates the damaging pressure oscillations characteristic of spark ignition knock.

In comparison to a spark ignition engine, the temperature of the charge at the beginning of the compression stroke typically may be increased to reach auto-ignition conditions at or near the end of the compression stroke. It will be appreciated by those skilled in the art that numerous other methods may be used to elevate initial charge temperature. Some of these include; heating the intake air (heat exchanger), keeping part of the warm combustion products in the cylinder (internal EGR) by adjusting intake and/or exhaust valve timing, compressing the inlet charge (turbocharging and supercharging), changing the auto-ignition characteristics of the fuel provided to the engine, and heating the intake air charge (external EGR).

During HCCI combustion, auto-ignition of the combustion chamber gas may be controlled to occur at a desired position of the piston or crank angle to generate desired engine torque, and thus it may not be necessary to initiate a spark from a sparking mechanism to achieve combustion. However, a late timing of the spark plug, after an auto-ignition temperature should have been attained, may be utilized as a backup ignition source in the case that auto-ignition does not occur.

A third type of combustion that may be performed by engine 10, such as in the case where a spark device is included, utilizes the sparking device to initiate (or assist) combustion when the temperature of the combustion chamber gas approaches an auto-ignition temperature (e.g., reaches a level substantially near auto-ignition without achieving combustion). Such a spark assist type of combustion can exhibit increased fuel efficiency and reduce NOx production over that of SI combustion, yet may operate in a higher torque range than compared with HCCI combustion. Spark assist may also offer an overall larger window for controlling temperature at a specified timing in the engine cycle. In other words, without spark assistance a small change in temperature may result in a rather large change in combustion timing, thus affecting engine output and performance. In the spark assist mode, it is possible to attain many of the benefits of HCCI combustion, but to rely on spark timing to provide the final energy needed to attain auto-ignition and thus more precisely control the timing of combustion. Thus, in one example, under some conditions, spark assist may also be used during transitions between SI combustion and HCCI.

In one embodiment, the spark assist mode may be operated where a small amount of fuel is provided to the gases near the spark plug. This small cloud of fuel may be used to allow a flame to better propagate and generate increased pressure in the cylinder to thereby initiate auto-ignition of the remaining air/fuel mixture. Thus, a relatively small cloud of richer gases may be used that are proximate to the spark plug, which can also be homogeneous, stratified, or slightly stratified. One approach to provide such operation may be to utilize a second direct fuel injection in the compression stroke.

One example of an application involving at least the three combustion modes presented above may include the use of SI for startup and/or after engine startup during an engine warming period. After such engine startup and engine warming, the combustion process may transition through spark assist combustion to HCCI combustion for improved fuel economy and emissions. During periods of high engine torque requirements, spark assist may be activated to ensure proper combustion timing. As the engine is returned to a low or moderate torque requirement, the involvement of spark assist may cease in order to realize the full benefits of HCCI.

As noted above, ambient humidity of air drawn into the engine during the intake stroke may affect combustion temperature via dilution of the charge with material that cannot be oxidized and because the specific heat of water is higher than air. Thus, as humidity increases, to attain a desired auto-ignition timing, initial charge temperature should be adjusted in accordance with humidity levels. For example, use of humidity sensing or estimation may thus enable improved adjustments to a plurality of engine operating parameters to aid in achieving or maintaining HCCI combustion, even when a vehicle may experience varying levels of ambient humidity. Thus, increasing humidity may require higher initial temperatures and lower humidity may require lower initial temperature for a given auto-ignition timing at a given speed and torque.

The ambient humidity of air drawn into the engine during the intake stroke also affects peak combustion temperatures because it has a higher specific heat than air, the more common diluent. As the ambient humidity of the air drawn into the engine during the intake stroke increases, the peak combustion temperature is decreased via dilution of the charge with material that cannot be oxidized and subsequently raises the required initial charge temperature to attain efficient HCCI combustion. The ambient or relative humidity can be determined using sensors 140 and/or 141 or may be inferred from other data and passed on to engine controller 12 to determine the ideal adjustments to engine control parameters for efficient operation.

Note that a plurality of other parameters may affect both the peak combustion temperature and the required temperature for efficient HCCI combustion. These and any other applicable parameters may be accounted for in the routines embedded in engine controller 12 and may be used to determine optimum operating conditions. For example, as the octane rating of the fuel increases, the required peak compression temperature may increase as the fuel requires a higher peak compression temperature to achieve ignition. Also, the level of charge dilution may be affected by a variety of factors including both humidity and the amount of exhaust gases present in the intake charge. In this way, it is possible to adjust engine parameters to compensate for the effect of humidity variation on auto-ignition, i.e., the effect of water makes auto-ignition less likely.

While one or more of the above combustion modes may be used in some examples, still other combustion modes may be used, such as stratified operation, either with or without spark initiated combustion.

As noted herein, in one example of a compression or auto-ignition capable engine, the intake valve(s) is (are) actuated either by a high or low lift cam profile depending on the selected combustion mode. The low lift cam profile is used to trap a high level of residual (exhaust) gas in the cylinder. The trapped gasses promote compression or auto-ignition by increasing the initial charge temperature, in some examples. However, in a spark ignition mode (either high or low loads) the high lift cam profile is used. Such a switchable cam profile may be achieved through various cam and tappet systems that switch between an inner and outer land, for example. The switching may be achieved through oil flow hydraulic actuators, which may necessitate a higher flow oil pump, thereby potentially increasing weight and cost and reducing efficiency (e.g., a higher flow oil pump may result in higher parasitic loss due to increased oil volume and potential issues related to a lack of sufficient flow in the oilways). As another example, such systems may involve an increased number of tappets as well as increased machining costs.

Thus, in another embodiment, rather than using a cylinder with a single intake valve (or multiple switchable intake valves) that changes between different profiles, a cylinder with at least two intake valves, where each of the valves has a different lift profile (at least for that cylinder), may be used. During the compression or auto-ignition, a higher and/or longer lift intake valve can be disabled through the use of a collapsible tappet, while a lower and/or short lift intake valve remains active. During spark ignition, the higher/longer lift intake valve can operate to increase the airflow into the engine, while the lower/shorter lift continues to operate.

Due to the fact that, in this example, only half of the valves now need to be switched, the oil flow requirements for the valve actuation is significantly reduced, thereby reducing the overall oil flow requirements of the engine system. Considering the valve harder, in this example, only half the tappets are switchable units and the camshaft may be made with a lower cost manufacturing process with considerably less machining. Further, the oil pump can have a lower working flow rate, reducing cost, and lower parasitic losses. In this way, system cost can be decreased while still providing both spark and compression or auto-ignition, along with transitions therebetween.

Active valve operation may refer to the valve opening and closing during a cycle of the cylinder, where deactivated valves may be held in a closed position for a cycle of the cylinder (or held in a fixed position for the cycle).

While the above examples illustrate the advantages of a particular situation, the approaches herein can be applied to a variety of different systems and configurations, such as to exhaust systems, as well as systems have more than two intake or two exhaust valves per cylinder.

Returning to an example intake valve system, the first intake valve can have a lower lift profile, capable on its own of flowing sufficient air to operate the engine in compression or auto-ignition. Further, the first intake valve can have a valve timing (fixed or adjustable) set for compression or auto-ignition. The second intake valve can have a valve lift and/or timing (fixed or adjustable) that provides the balance of the air for spark-ignition, over and above the air required for compression or auto-ignition, as illustrated in the example of FIG. 3.

Valve deactivation may be provided via switchable tappets fitted to a higher/longer lift valve, which in one example is active only during spark-ignition operation. During compression or auto-ignition, the tappet may deactivate to leave the higher/longer lift valve closed during a cycle of the cylinder. The lower/shorter lift valve can be permanently active to open and close during a cycle of the cylinder to provide either all the air during compression or auto-ignition, or part of the air for spark ignition.

However, in another embodiment, a higher/longer lift intake valve may also be deactivated under conditions other than compression or auto-ignition, such as during vehicle deceleration to reduce airflow during deceleration fuel shutoff, or other conditions. Furthermore, different valves have been denoted as having a higher or shorter lift, which may be identified by a maximum valve lift or an average valve lift height (opening into the cylinder). Likewise, valves with a shorter or longer lift may be identified by a crank angle opening duration, for example, even though the valves may open and/or close earlier or later during the cylinder cycle.

Figure 3:
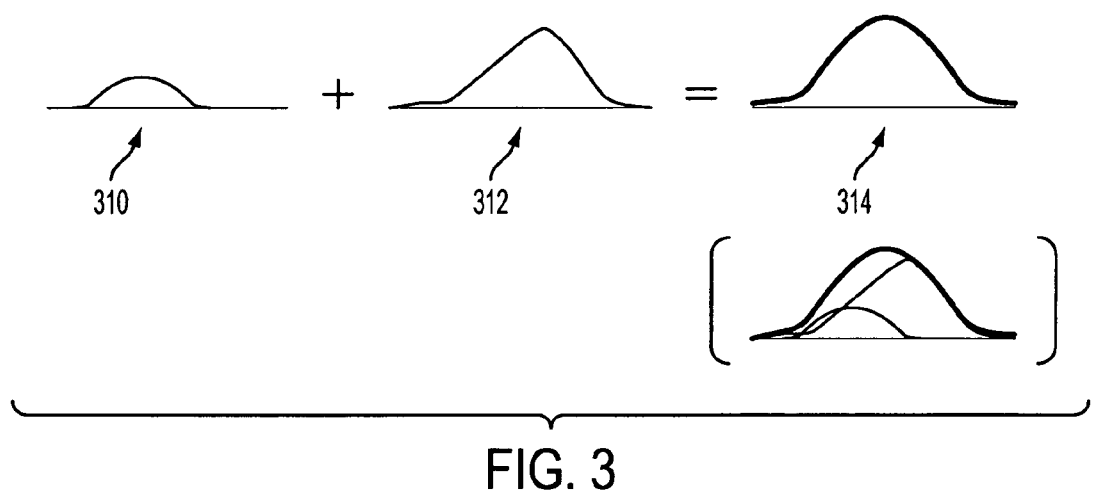
FIG. 3 illustrates example lift profiles.

Referring now to FIG. 2A, it shows an example cylinder configuration where two intake valves (52*a* and 52*b*) of cylinder 30 of engine 10 are actuated via a common camshaft 130, with each having a different cam profile 210 and 212, examples of which are described in more detail with regard to FIG. 3. The figures show valve 52*a* having a longer and higher valve lift profile than 52*b*. In this example, valve 52*b* is actuated via a tappet 216, while valve 52*b* is actuated by a collapsible tappet 214, which may be controlled via controller 12.

FIG. 2A also shows two exhaust valves 54*a* and 54*b*, also actuated via profiles 220 and 222 through tappets 224 and 226, where tappet 224 may be deactivatable via controller 12. In this example, valve is shown having a longer and higher valve lift than valve 54*b*.

While this example shows an overhead cam engine with a tappet coupled to the valve stems, tappets may also be used with pushrod engine, and a collapsible tappet may thus be coupled to a pushrod.

Further, the diagram of FIG. 2A shows just one cylinder of engine 10, where the engine may be a multiple cylinder engine with each cylinder the same as, similar to, or different from the one shown in FIG. 2A. Further, while the above valve system can provide advantages in an engine having compression or auto-ignition, it may also be used in other engine combustion systems.

Referring now to FIG. 2B, it shows an alternative camshaft and tappet configuration. Specifically, in this example, the lift profile 210 is divided in to lift portions 210A and 210C and zero lift portion 210B. During active valve operation, tappet 284 is actuated as a unit by profiles 210A and 210C, and during deactivation, an outer portion of 284 is decoupled from an inner portion as described in FIG. 2C, so that valve 52*a* is not activated. Likewise, lift 220 is similarly divided, and tappet 294 is similar to tappet 284. Thus, an alternative approach for deactivation is shown that may provide improve manufacturability, for example. Also note that a single profile, such as 210A, may be used, rather than the double profile (210A and 210C) shown.

Figure 2C:
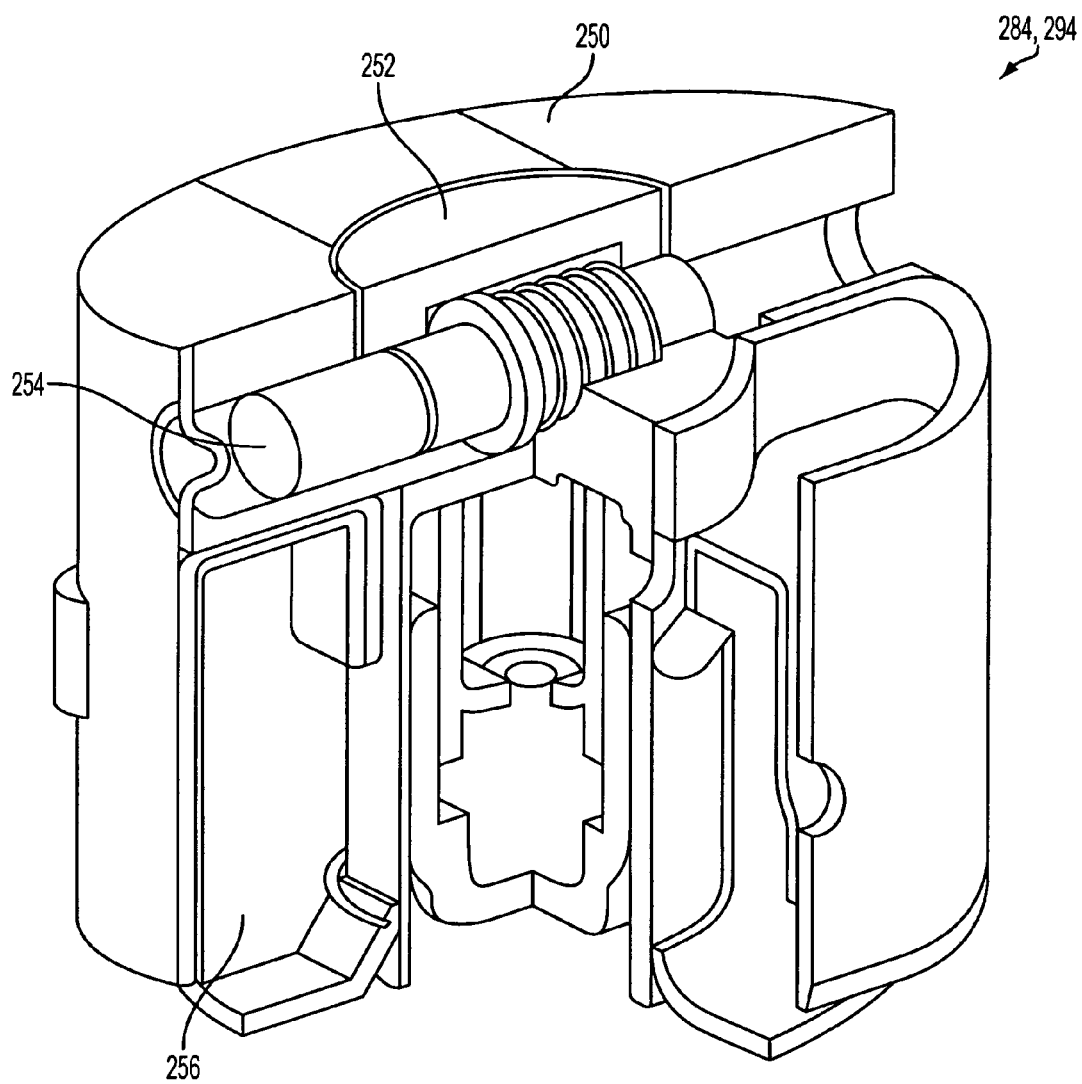
FIG. 2C shows an example detail view of a tappet for use with the example of FIG. 2B

Specifically, FIG. 2C shows an alternative deactivatable tappet in which locking pin 254 is used to couple or decouple inner portion 252 from outer portion 250. In this way, when the pin is in the locked position, the motion caused by the contact with profiles 210A and 210C causes the inner portion to follow the motion and thus actuate the valve stem and valve coupled to the inner portion. Alternatively, when the pin is the unlocked position, a lost motion spring in interior section 256 causes outer portion 250 to travel separate from inner portion 252. Further, because profile 210B, which is in contact with the inner portion 252, has little or no lift, the valve remains substantially closed and thus the cylinder may be deactivated. The pin 254 may be actuated via hydraulic pressure controlled via a hydraulic valve communicating with the controller, in one example.

In this way, an alternative approach using a deactivatable tappet may be used in which manufacturability of the tappet may be increased, while still retaining the desired action.

Finally, still other examples of valve deactivation may be used, if desired.

Referring now to FIG. 3, it shows at 310 an example lift profile of valve 52*b* which profile may be used to provide a desired fresh air charge and residual charge to improve compression or auto-ignition, such as by providing a higher initial charge temperature at the start of compression. As noted herein, in one example, valve 52*b* does not have a deactivation mechanism. FIG. 3 also shows at 312 an example lift profile of valve 52*a*, which profile may be used to provide a desired operation for spark ignition operation. In the example of FIG. 3, profile 312 has some lift portions that are higher than that of 310, and also a longer lift than that of 310. As noted herein, valve 312 may be selectively deactivated during compression or auto-ignition operation via a deactivatable tappet.

When both intake valves are active, an effective lift profile as illustrated by 314, may be achieved, whereas the profile 310 controls during compression or auto-ignition, at least in one example.

Figure 4:
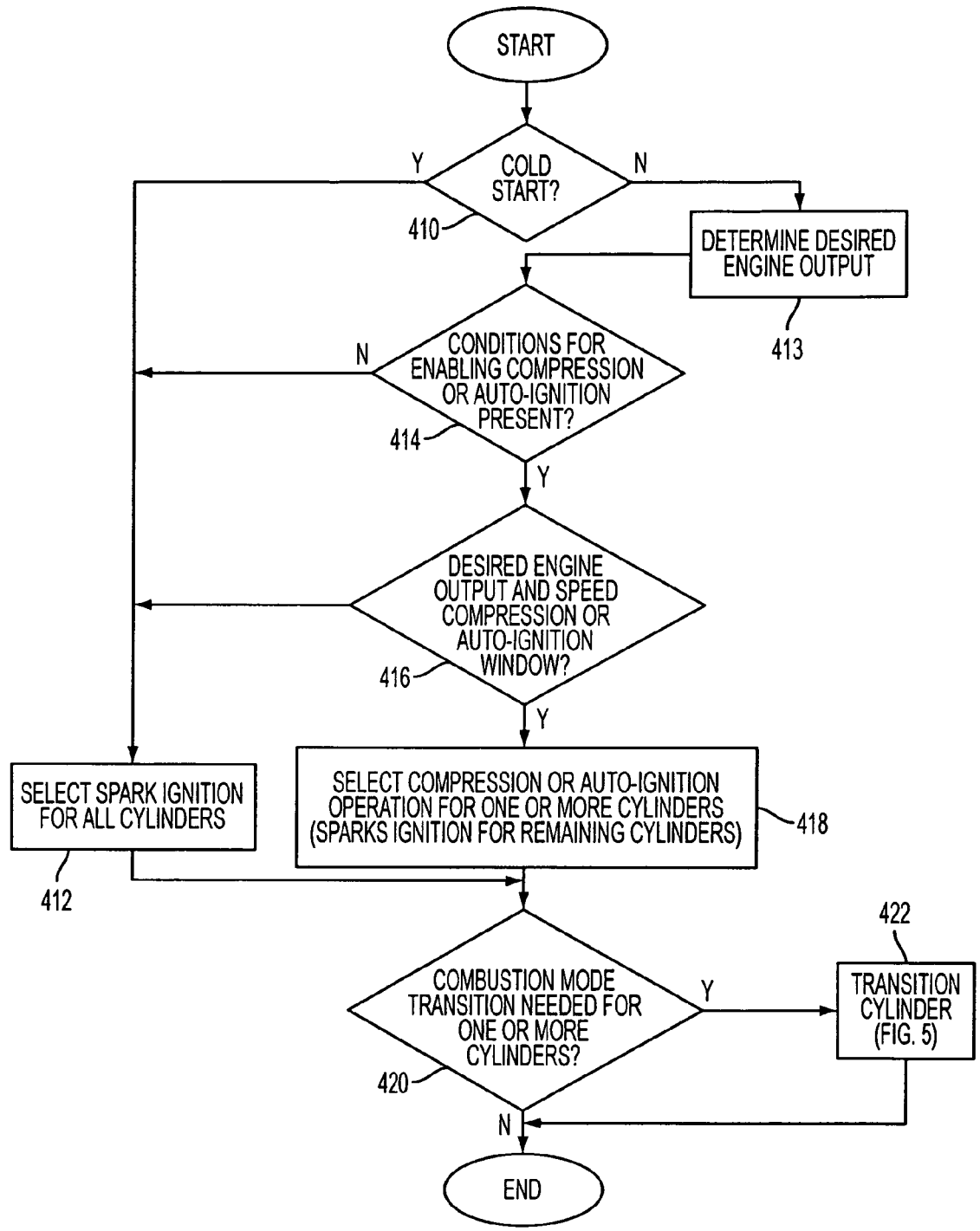
FIGS. 4-6 show high level flow charts for carrying out example system operation.

Referring now to FIG. 4, it shows a high level flowchart of an example routine for selecting an engine operating mode based on operating conditions. In 410, the routine determines whether the engine is currently being started when the temperature is less than a preselected valve. The temperature may be an engine coolant temperature, ambient air temperature, engine oil temperature, transmission oil temperature, combinations thereof, or others. If so, the routine continues to 412 to select spark ignition combustion for all of the engine cylinders, so that the engine is started with spark ignition combustion. Otherwise, the routine continues to 413 to determine a desired engine output, such as a desired engine or wheel torque based on a driver request, traction control, cruise control, vehicle stability control, combinations thereof, or others. Next, in 414, the routine determines whether conditions for enabling compression or auto-ignition are present. Such conditions may be temperatures (such as noted with regard to 410), manifold pressure, fuel vapor storage or purging status, humidity, vehicle speed, combinations thereof, or others.

If the answer to 414 is no, the routine continues to 412. Otherwise, the routine continues to 416 to determine whether the desired engine output and engine speed are within a fixed compression or auto-ignition window. If so, the routine continues to 418, otherwise the routine continues to 412. Note that the window may have hysteresis to reduce excessive switching between modes, for example. Further, the window may vary with other operating conditions, for example.

In 418, the routine determines whether one or more cylinders (and the number of such cylinders) should be operated with compression or auto-ignition, with spark ignition selected for any remaining cylinders. For example, the routine may select a number of compression or auto-ignition cylinders based on the desired torque output, transmission state, etc.

From either 412 or 418, the routine continues to 420 to determine whether the determined or selected cylinder combustion mode for each of the cylinders is different than the current combustion mode of the cylinder. If so, a transition for one or more cylinders is carried out in 422, example details of which are described further in FIG. 5. For example, if multiple cylinders are to be transitioned from one combustion mode to another, the cylinders can carry out the transition in a single engine cycle, or the transition of cylinders can be extended over a longer duration to reduce any driver indication that a transition is occurring.

Figure 5:
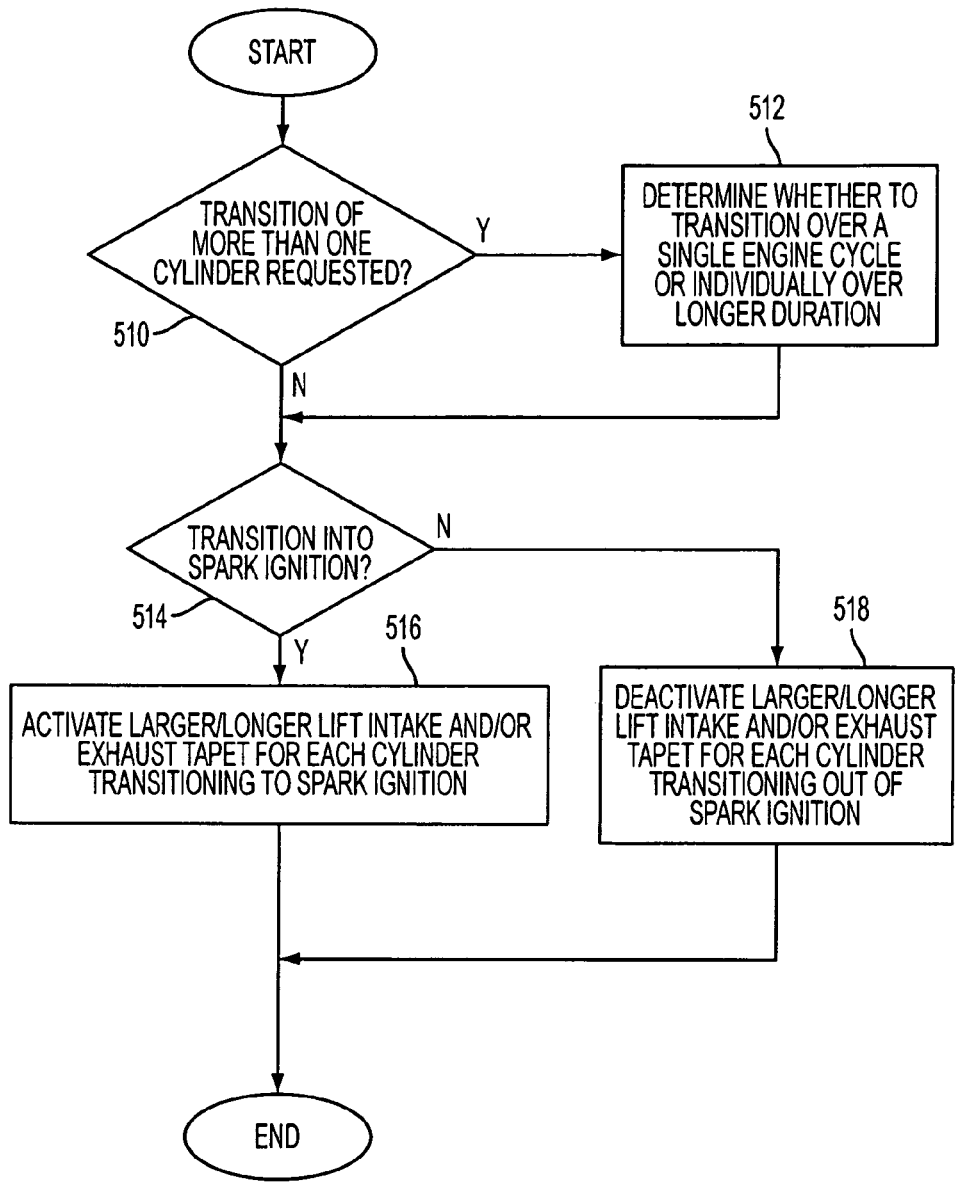

Referring now to FIG. 5, in 510 the routine determines whether a transition is to be performed for one or more cylinders. If so, the routine continues to 512 to determine a duration over which to perform the transition. Then, in 514, the routine determines whether transition(s) to be performed are into spark ignition combustion. If so, the routine continues to 516, otherwise the routine continues to 518.

Note that if some cylinders are to be transitioned into spark ignition and some out of spark ignition, the routine of 514 may be repeated on an individual cylinder basis, for example. In this way, the engine can operate with some cylinders transitioning form spark ignition to compression or auto-ignition, while other transition from compression or auto-ignition into spark ignition.

Continuing with FIG. 5, in 516, the routine activates an intake and/or exhaust valve with a longer and/or larger lift via a deactivatable tappet to transition the cylinder into spark ignition combustion. Note that the timing of the activation may be performed after an intake stroke but before an exhaust stroke, in one example.

Conversely, in 518, the routine deactivates an intake and/or exhaust valve with a longer and/or larger lift via the deactivatable tappet to transition the cylinder out of spark ignition and into compression or auto-ignition (where an intake and/or exhaust with a shorter and/or lower lift remains active). Note that it may take several combustion cycles to establish compression or auto-ignition, and thus a spark-assisted auto-ignition may be used.

In the above examples, it is thus possible to change combustion modes without requiring lift profile switching, rather simple valve deactivation may be used. Such a construction can be beneficial for pushrod as well as overhead cam engines.

Figure 6:
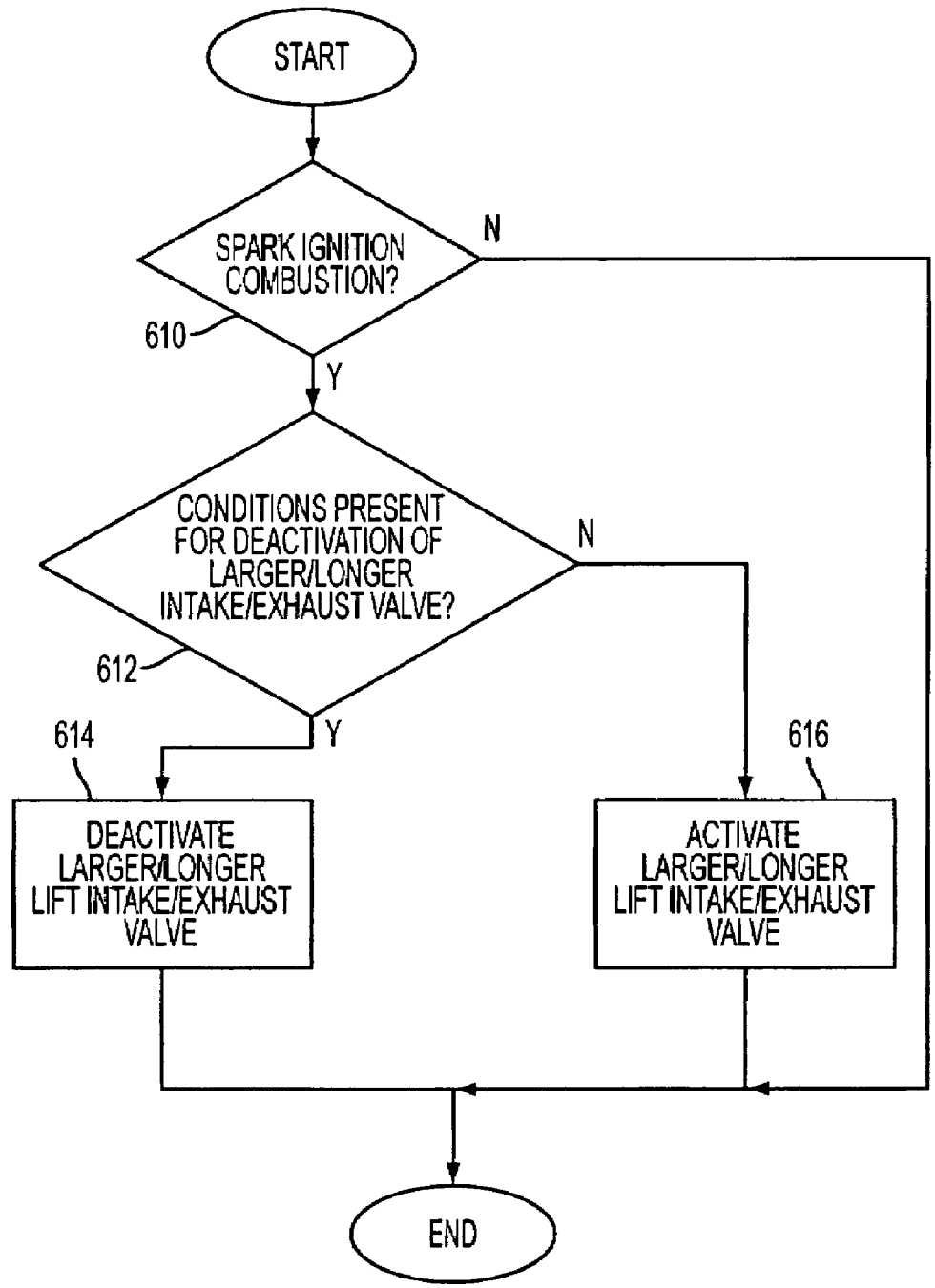

Referring now to FIG. 6, a routine is described that may be used to select different valve operation within spark ignition combustion. Specifically, in 610, the routine determines whether one or more cylinders of the engine is operating with spark ignition combustion. If so, the routine continues to 612 to determine whether any condition is present for operating one or more spark ignition cylinders with an intake/exhaust valve having a larger lift deactivated. Such conditions may be during vehicle deceleration, idle speed operation, combinations thereof, or others.

If deactivation is selected in 612, the routine continues to 614 the intake and/or exhaust valve with a larger and/or longer lift. Otherwise, in 616, the routine activates the valve(s), if not already activated.

Note that the control routines included herein can be used with various engine configurations, such as those described above. The specific routine described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in controller 12.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. As another example, various other mechanisms may be used in a system using two different valve profiles for each of the valves in a cylinder, and the selective deactivation of one or more valves to provide the correct flow conditions for compression or auto-ignition combustion. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A method for operating an engine of a vehicle, the engine having a cylinder with at least a first and second intake valves, the method comprising:
   during a first mode, operating with the first valve active and the second valve deactivated during a cycle of the cylinder, where during said first mode, the first valve operates to allow at least intake air to enter the cylinder during an intake stroke, where the air is mixed with fuel and compressed to attain auto-ignition; and
   during a second mode, operating with the first and second valves active during a cycle of the cylinder, where during said second mode, the first and second valves operate to allow at least intake air to enter the cylinder, where the air is mixed with fuel and ignited via a spark from an ignition plug.

2. The method of claim 1 wherein said air is mixed with directly injected fuel during an intake stroke.

3. The method of claim 1 wherein said air is mixed in an intake manifold via port injection.

4. The method of claim 1 wherein the cylinder further having a first and second exhaust valve, where during said first mode, the first exhaust valve is active and the second exhaust valve is deactivated, and during the second mode, both said first and second exhaust valve are active during a cycle of the cylinder.

5. The method of claim 1 wherein during a transition from said first mode to said second mode, said second valve is activated and the first valve is maintained active, where said first and second valves are intake valves of the cylinder.

6. The method of claim 1 wherein a lift profile of said second valve is longer than a lift profile of said first valve, and where the first valve operates with the same valve profile in the first and second mode.

7. The method of claim 1 wherein a lift profile of said second valve is higher than a lift profile of said first valve.

8. The method of claim 5 wherein a single cam actuates both said first and second valve.

9. The method of claim 8 wherein said second intake valve is deactivated via a collapsible tappet.

10. A system for operating an engine of a vehicle, the engine having a cylinder, the system comprising:
    a first intake valve in the cylinder;
    a second intake valve in the cylinder;

the first intake valve and the second intake valve actuated via a common camshaft, where the lift profile of the first valve is different than that of the second valve, where an actuating tappet of the second valve has a deactivation device configured to deactivate the second valve, and where an actuating tappet of the first valve is actuated by said camshaft under all conditions; and a controller for during a first mode, operating with the first intake valve active and a second intake valve deactivated during a cycle of the cylinder, where during said operation, where the first intake valve is open at least partially during an intake stroke to allow at least air to enter the cylinder, where the air is mixed with fuel and compressed to attain auto-ignition; and during a second mode, operating with the first intake and second intake valves active during a cycle of the cylinder, where during said operation, the first and second intake valves are open at least partially during an intake stroke to allow at least air to enter the cylinder, where the air is mixed with fuel and ignited via a spark from an ignition plug.

11. The system of claim 10 wherein the lift profile of the first intake valve is shorter than the lift profile of the second intake valve.

12. The system of claim 11 wherein the lift profile of the first intake valve is smaller than the lift profile of the second intake valve.

13. The system of claim 12 further comprising:
a first exhaust valve in the cylinder;
a second exhaust valve in the cylinder;
the first exhaust valve and the second exhaust valve actuated via a common camshaft, where the lift profile of the first exhaust valve is different than that of the second exhaust valve, where an actuating tappet of the second exhaust valve has deactivation device configured to deactivate the second exhaust valve, and where an actuating tappet of the first exhaust valve is actuated by camshaft under all conditions.

14. The system of claim 12 wherein during a transition from said first mode to said second mode, said controller activates said second valve and maintains the first valve active.

15. The system of claim 10 wherein a lift profile of said second intake valve is longer than a lift profile of said first valve.

16. The system of claim 10 wherein a lift profile of said second valve is higher than a lift profile of said first valve.

17. A method for operating an engine of a vehicle, the engine having a cylinder with at least a first and second intake valve actuated by a common camshaft, the method comprising:

during a first mode, operating with the first intake valve active and the second intake valve deactivated during a cycle of the cylinder, where during said operation, where the first valve is open at least partially during an intake stroke to allow at least air to enter the cylinder, where the air is mixed with fuel and compressed to attain auto-ignition; and during a second mode, operating with the first and second valves active during a cycle of the cylinder, where during said operation, the first and second valve are open at least partially during an intake stroke to allow at least air to enter the cylinder, where the air is mixed with fuel and ignited via a spark from an ignition plug; and during a transition from said first mode to said second mode, activating said second valve while maintaining the first valve activated, wherein a lift profile of said second valve is longer and larger than a lift profile of said first valve and where said second intake valve is deactivated via a collapsible tappet.

18. The method of claim 17 wherein said compressed air and fuel attain auto-ignition in said first mode without a spark initiated by a spark plug.

19. The method of claim 18 wherein deactivation of said second intake valve increases exhaust gas residuals in the cylinder.

* * * * *